United States Patent
Inukai et al.

(10) Patent No.: US 11,064,172 B2
(45) Date of Patent: Jul. 13, 2021

(54) IMAGE DISPLAY SYSTEM, MOVABLE OBJECT, IMAGE DISPLAY METHOD, AND NON-TRANSITORY COMPUTER-READABLE MEDIUM

(71) Applicant: PANASONIC INTELLECTUAL PROPERTY MANAGEMENT CO., LTD., Osaka (JP)

(72) Inventors: Fumihito Inukai, Kyoto (JP); Kosuke Kubota, Kanagawa (JP); Yukihiro Chokyu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/822,814

(22) Filed: Mar. 18, 2020

(65) Prior Publication Data
US 2020/0314399 A1    Oct. 1, 2020

(30) Foreign Application Priority Data

Mar. 25, 2019    (JP) .............................. JP2019-057235

(51) Int. Cl.
*H04N 9/31* (2006.01)
(52) U.S. Cl.
CPC ......... *H04N 9/3185* (2013.01); *H04N 9/3129* (2013.01); *H04N 9/3161* (2013.01)
(58) Field of Classification Search
CPC .. H04N 9/3155; H04N 9/3129; H04N 9/3182; H04N 9/312; H04N 9/3161; H04N 9/3164; H04N 9/3179; H04N 9/3111; H04N 9/3135; H04N 9/315; H04N 9/31; H04N 9/3138; H04N 9/3185; G09G 3/3413; G09G 3/3406; G02B 26/10
(Continued)

(56) References Cited

U.S. PATENT DOCUMENTS

| 2012/0188266 A1 | 7/2012 | Sakai et al. |
| 2014/0253527 A1* | 9/2014 | Ogi .......................... G09G 5/02 345/207 |

(Continued)

FOREIGN PATENT DOCUMENTS

JP    2012-155020    8/2012

*Primary Examiner* — Sherrie Hsia
(74) *Attorney, Agent, or Firm* — Greenblum & Bernstein, P.L.C.

(57) ABSTRACT

An image display system includes: a light source driver configured to supply, to a light source, a drive current including a first current and a second current; a processor configured to output the set value of the first current to the light source driver; and a corrector configured to perform a correction process on the first current. The processor is configured to set, based on a correspondence relationship between the gradation value and the current value of the first current, the set value of the first current to a current value determined with reference to the correspondence relationship when the gradation value is in a second gradation range in which numerical values are smaller than numerical values in the first gradation range, the correction process correcting the correspondence relationship such that a difference between a measured intensity and a target intensity of the light source falls within a prescribed range.

11 Claims, 8 Drawing Sheets

(58) Field of Classification Search
USPC .............. 348/744, 739, 742, 795, 798, 799; 345/204
See application file for complete search history.

(56) References Cited

U.S. PATENT DOCUMENTS

| | | | |
|---|---|---|---|
| 2015/0161926 A1* | 6/2015 | Ogi | G09G 3/346 345/207 |
| 2015/0260984 A1* | 9/2015 | Yamakawa | H04N 9/3182 345/591 |
| 2017/0287375 A1* | 10/2017 | Ukai | G09G 3/025 |
| 2019/0228705 A1* | 7/2019 | Furuya | G02B 26/101 |

* cited by examiner

IMAGE DISPLAY SYSTEM, MOVABLE OBJECT, IMAGE DISPLAY METHOD, AND NON-TRANSITORY COMPUTER-READABLE MEDIUM

CROSS-REFERENCE TO RELATED APPLICATIONS

This application is based upon and claims priority to Japanese Patent Application No. 2019-057235, filed Mar. 25, 2019, the contents of which are incorporated herein by reference in their entirety.

TECHNICAL FIELD

The present disclosure relates to image display systems, movable objects, image display methods, and non-transitory computer-readable media. More specifically, the present disclosure relates to an image display system configured to output a laser beam in accordance with a drive current including a first current which changes in accordance with a gradation value indicated by an image signal and a second current which does not change in accordance with the gradation value, a movable object on which the image display system is mounted, an image display method, and a non-transitory computer-readable medium.

BACKGROUND ART

Document 1 (JP 2012-155020 A) discloses an image display device configured to display an image by a laser beam. The image display device includes: light sources for RGB light colors for drawing an image; and a control unit configured to control the light sources. Each of the light sources is configured to output a laser beam of a corresponding one of the RGB light colors. The control unit is configured to output a drive current to each light source to control an intensity of the laser beam to be output from each light source. The drive current is obtained by adding a scale current which changes in accordance with a gradation value of an image signal to an offset current which does not change in accordance with the gradation value of the image signal.

In the image display device described in Document 1, white balance is adjusted in a background process while a user views a display image displayed by the image display device. At this time, the offset current is increased and reduced to search for an optimal value of the white balance. However, when the offset current is increased and reduced, the gradation of the entirety of the display image is increased and reduced, which disturbs the gradation of the display image.

SUMMARY

It is an object of the present disclosure to provide an image display system, a movable object, an image display method, and a non-transitory computer-readable medium which are configured to correct a gradation of a display image while disturbance in the gradation of the display image is reduced.

A image display system of an according to one aspect of the present disclosure includes: a light source driver configured to supply, to a light source, a drive current including a first current which changes in accordance with a gradation value indicated by an image signal and a second current which does not change in accordance with the gradation value and generate the first current based on a set value of the first current; a processor configured to generate the set value of the first current in accordance with the image signal and output the set value of the first current generated to the light source driver; and a corrector configured to perform a correction process on the first current generated based on the set value of the first current generated by the processor to correct the drive current. The processor is configured to set the set value of the first current to a current value proportional to the gradation value when the gradation value of the image signal is within a first gradation range, and set, based on a correspondence relationship between the gradation value and the current value of the first current, the set value of the first current to a current value determined with reference to the correspondence relationship when the gradation value is in a second gradation range in which numerical values are smaller than numerical values in the first gradation range. The correction process includes a process of correcting the correspondence relationship such that a difference between a measured intensity and a target intensity of a light beam from the light source falls within a prescribed range.

A movable object according to one aspect of the present disclosure includes: the image display system of the one aspect; and a movable object body on which the image display system is mounted.

An image display method according to one aspect of the present disclosure includes: a light source driving process of supplying, to a light source 2, a drive current Idr including a first current which changes in accordance with a gradation value indicated by an image signal and a second current which does not change in accordance with the gradation value to generate a first current based on a set value of the first current; an output process of generating the set value of the first current in accordance with the image signal and outputting the set value of the first current generated; and a correction process of performing a correction process on the first current generated based on the set value of the first current generated in the output process to correct the drive current. The output process includes setting the set value of the first current to a current value proportional to the gradation value when the gradation value of the image signal is within a first gradation range and setting, based on a correspondence relationship between the gradation value and the current value of the first current, the set value of the first current to a current value determined with reference to the correspondence relationship when the gradation value is in a second gradation range in which numerical values are smaller than numerical values in the first gradation range. The correction process includes a process of correcting the correspondence relationship such that a difference between a measured intensity and a target intensity of a light beam from the light source falls within a prescribed range.

A non-transitory computer-readable medium according to one aspect of the present disclosure is a non-transitory computer-readable medium on which a program configured to cause a computer system to execute the image display method is recorded.

DETAILED DESCRIPTION

First Embodiment

With reference to FIGS. 1 to 8, an image display system 1 according to the present embodiment will be described in detail.

Description of Schema

Figure 1:
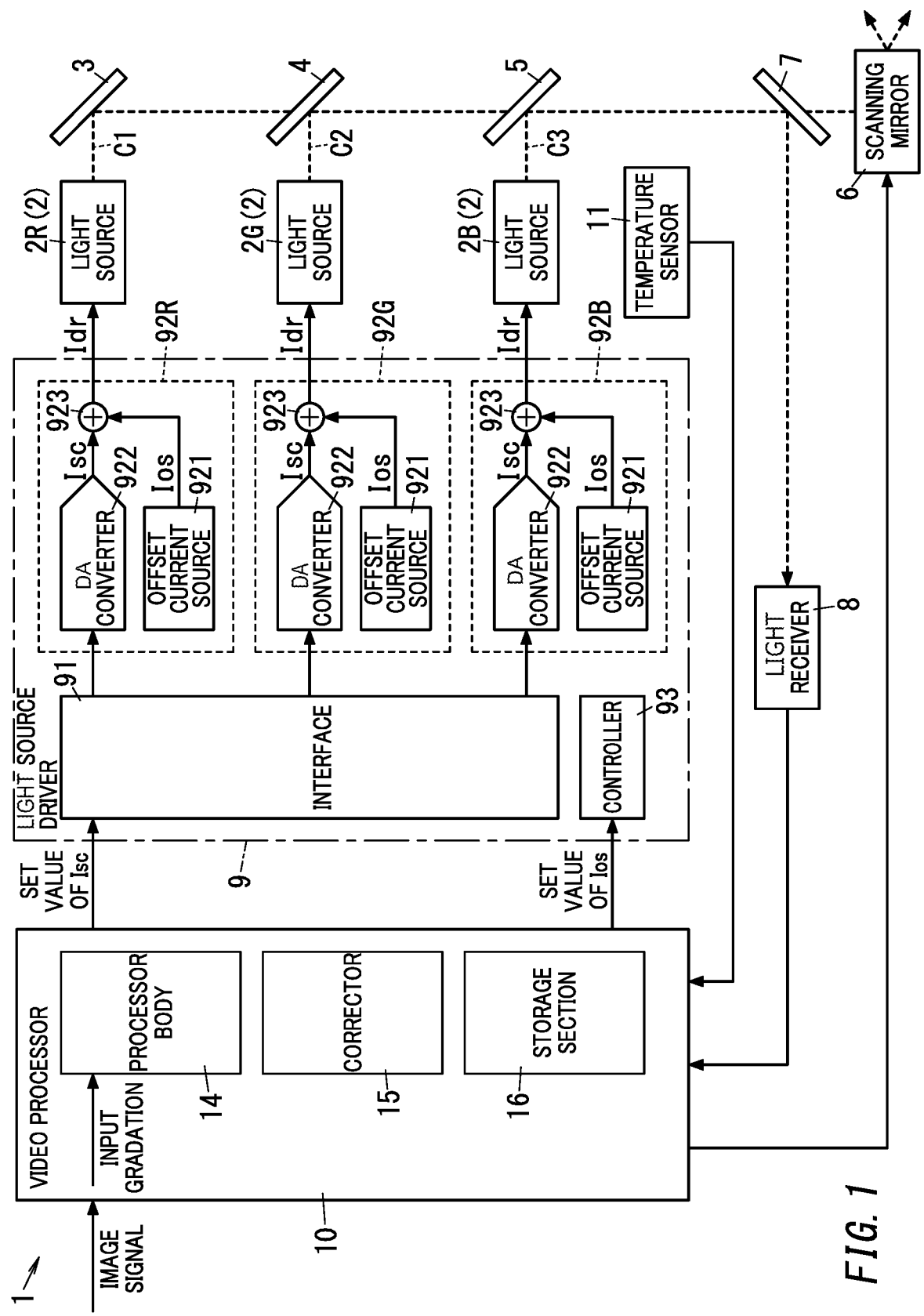
FIG. 1 is a configuration diagram schematically illustrating a configuration of an image display system according to an embodiment.

As illustrated in FIG. 1, the image display system 1 according to the present embodiment is a system configured to irradiate a display object with a laser beam to display an image on the display object. In the present embodiment, the image display system 1 is mounted on, for example, a movable object body of the movable object. The movable object is, for example, an automobile which runs on a road with a person riding on the automobile. That is, the movable object includes: the image display system 1; and a movable object body on which the image display system 1 is mounted.

Moreover, the image display system 1 is installed, for example, below a windscreen (also referred to as a front window) (e.g., in a dashboard) in an interior of a vehicle as the movable object and outputs a laser beam to the windscreen to display an image on the windscreen. The driver visually perceives the image displayed to overlay a real space in a front direction of the movable object. In this case, the image display system 1 may display, as the image, various types of drive assistance information (e.g., navigation information, captured image, vehicle speed information, pedestrian information, peripheral vehicle information, lane deviation information, and vehicle condition information).

The image display system 1 includes a plurality of (e.g., three) light sources 2 (a red light source 2R, a green light source 2G, and a blue light source 2B), dichroic mirrors 3, 4, and 5, a scanning mirror 6, a transmission mirror 7, a light receiver 8, a light source driver 9, a video processor 10, and a temperature sensor 11. Note that since it is assumed in the present embodiment that the image display system 1 displays a color image, the image display system 1 includes the light sources 2R, 2B, and 2G of respective colors, but when a single-color image is to be displayed, at least one light source is provided.

Each of the light sources 2 of respective colors outputs a laser beam having an intensity corresponding to a drive current Idr received from the light source driver 9. Each of the light sources 2 of respective colors includes a semiconductor laser (e.g., a laser diode). The red light source 2R generates and outputs a red laser beam C1. The green light source 2G generates and outputs a green laser beam C2. The blue light source 2B generates and outputs a blue laser beam C3.

Each of the dichroic mirrors 3, 4, and 5 reflects a laser beam of a corresponding one of light colors among red light, green light, and blue light different from one another and transmits laser beams of the other of the light colors. The dichroic mirror 3 is disposed in front of the red light source 2R. The dichroic mirror 3 is configured to reflect a red laser beam output from the red light source 2R so as to cause the red laser beam to be transmitted through the dichroic mirrors 4 and 5 toward the scanning mirror 6. The dichroic mirror 4 is disposed in front of the green light source 2G. The dichroic mirror 4 is configured to reflect a green laser beam output from the green light source 2G so as to cause the green laser beam to be transmitted through the dichroic mirror 5 toward the scanning mirror 6. The dichroic mirror 4 is configured to transmit the red laser beam reflected off the dichroic mirror 3. The dichroic mirror 5 is disposed in front of the blue light source 2B. The dichroic mirror 5 is configured to reflect a blue laser beam output from the blue light source 2B toward the scanning mirror 6. The dichroic mirror 5 is configured to transmit the laser beams of the light colors (red and green colors) reflected off the dichroic mirrors 3 and 4. The laser beams of the colors reflected off the dichroic mirrors 3, 4, and 5 are combined into one laser beam, and the one laser beam is incident on the scanning mirror 6.

The scanning mirror 6 reflects the laser beam incident on the scanning mirror 6 toward the display object. Moreover, in accordance with control by the video processor 10, the scanning mirror 6 performs scanning two-dimensionally in reflection direction of the laser beam incident on the scanning mirror 6, thereby drawing an image on the display object by the laser beam. The drawing results in the image displayed on the display object.

The scanning mirror 6 includes a mirror section, two rotation axes provided to the mirror section, and a driver configured to rotate the two rotation axes. The mirror section is an optical component that reflects the laser beam incident on the mirror section. The two rotation axes are orthogonal to each other. One of the two rotary shafts is a rotary shaft for scanning by the mirror section in a lateral direction of the image. The other of the two rotary shafts is a rotary shaft for scanning by the mirror section in a longitudinal direction of the image. Rotating the mirror section about the two rotation axes enables the laser beam incident on the mirror section to be reflected while two-dimensional scanning by the laser beam is performed. The scanning mirror 6 includes, for example, a micro electro mechanical systems (MEMS) mirror.

In order to feed the intensity of the laser beam output from each light source 2 back to the video processor 10, the transmission mirror 7 reflects part of the laser beam toward the light receiver 8. The transmission mirror 7 is disposed, for example, between the dichroic mirror 5 and the scanning mirror 6. The transmission mirror 7 is configured to reflect, toward the light receiver 8, part of the laser beam propagating from the dichroic mirror 5 toward the scanning mirror 6. The transmission mirror 7 is configured to transmit a remaining part of the laser beam to be incident on the scanning mirror 6.

The light receiver 8 receives the laser beam reflected off the transmission mirror 7 and outputs an electric signal according to the intensity of the laser beam to the video processor 10.

The light source driver 9 generates a drive current Idr for each light source 2 in accordance with a drive signal from the video processor 10 and supplies the drive current Idr thus generated to each light source 2. Thus, each light source 2 outputs a laser beam having an intensity corresponding to the drive current Idr received from the light source driver 9.

A drive current Idr supplied to the red light source 2R is obtained by adding a scale current Isc (first current) to an offset current Ios (second current). The scale current Isc of the drive current Idr supplied to the red light source 2R is a current that changes in accordance with a gradation value of a red component of an image to be displayed on the display object. The offset current Ios of the drive current Idr supplied to the red light source 2R is a current that does not change in accordance with the gradation value of the red component of the image to be displayed on the display object. That is, the drive current Idr supplied to the red light source 2R includes a current portion (the scale current Isc) which changes in accordance with the gradation value of the red component of the image and a current portion (the offset current Ios) which does not change in accordance with the gradation value of the red component of the image. A drive current Idr to be supplied to the green light source 2G and a drive current Idr to be supplied to the blue light source 2B are each obtained by adding a scale current Isc to an offset current Ios in a similar manner to the drive current Idr to be supplied to the red light source 2R.

Note that the gradation value is a value representing the level of the brightness of each pixel in the image when the brightness is expressed, for example, in 256 levels, and the gradation value can take any value from 0 to 255. For example, when the gradation value is 0, this means the lowest brightness in 256 gradations, whereas when the gradation value is 255, this means the highest brightness in 256 gradations.

Here, with reference to FIG. 2, the intensity characteristic of the light source 2 as a semiconductor laser will be described.

Figure 2:
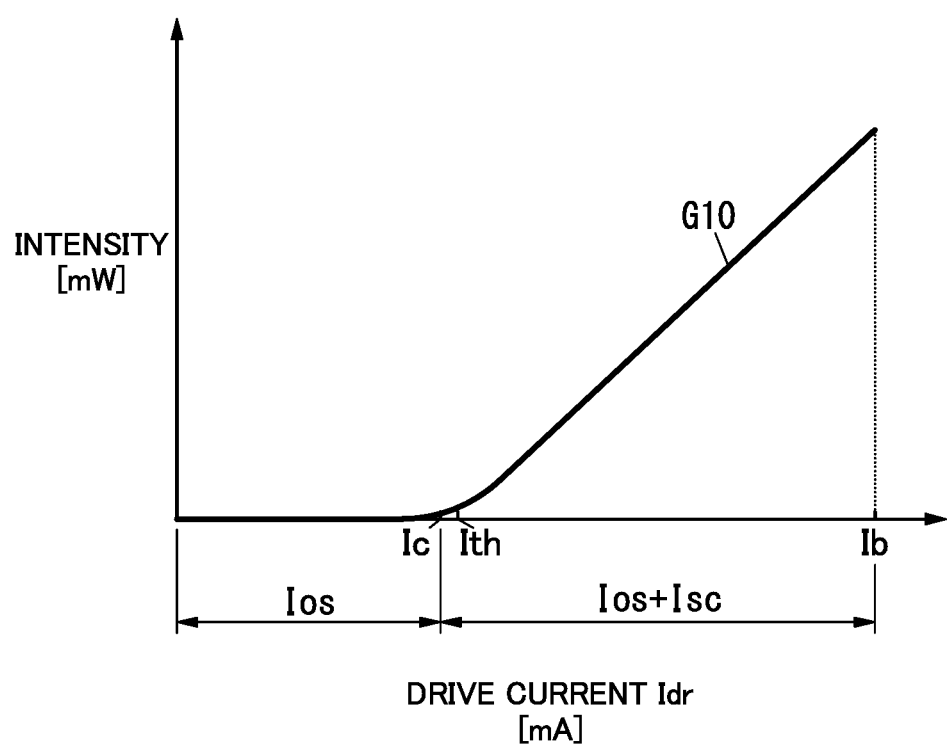
FIG. 2 is an intensity characteristic diagram illustrating one example of a relationship between a drive current and an intensity of a laser beam output from a light source of the image display system.

An intensity characteristic G10 shown in FIG. 2 shows a relationship between the drive current Idr supplied to the light source 2 and the intensity of the laser beam output from the light source 2. As illustrated in FIG. 2, until the current value of the drive current Idr supplied to the light source 2 reaches a threshold current value Ith specific to the light source 2, the intensity of the laser beam hardly changes along with an increase of the current value. When the current value of the drive current Idr supplied to the light source 2 exceeds the threshold current value Ith, the intensity of the laser beam exponentially increases. The threshold current value Ith is a current value at which the light source 2 starts emitting a light beam.

Based on the intensity characteristic of the light source 2 as described above, the offset current Ios is supplied to the light source 2 in order to increase responsiveness of light emission from the light source 2. Specifically, the light source 2 includes a capacitor, and therefore, while the drive current Idr supplied increases from 0 to the threshold current value Ith, part of the drive current Idr is used for charging the capacitor, thereby retarding a rise of the drive current Idr which contributes to actual light emission. Thus, the light source 2 of each color requires a delay time from a start of supplying of the drive current Idr until emission of a light beam.

Thus, the offset current Ios (set value Ic) is supplied to the light source 2 of each color to achieve a standby state of the light source 2 so as to reduce the delay of light emission. Then, the scale current Isc which changes in accordance with the gradation value of the image is added to the offset current Ios to increase the responsiveness of light emission of the light source 2. As described above, the drive current Idr is obtained by adding the offset current Ios which does not change in accordance with the gradation value (i.e., whose current value is fixed) to the scale current Isc which changes in accordance with the gradation value. The offset current Ios is desirably set to a current value (set value Ic) smaller than or equal to the threshold current value Ith of the light source 2. The scale current Ise can take a current value within a range from the set value Ic to a maximum current value Ib of the offset current Ios.

The light source 2 outputs a laser beam for use in drawing of an image with the current value of the drive current Idr being within a range from the current value Ic to the maximum current values Ib of the offset current Ios. That is, when the current value of the drive current Idr supplied to the light source 2 is the set value Ic of the offset current Ios, this state corresponds to a state where the image is darkest (gradation value 0), when the current value of the drive current Idr supplied to the light source 2 is the maximum current values Ib, this state corresponds to a state where the image is brightest (gradation value 255), and the range of the gradation values from 0 to 255 corresponds to the range of intensity with which a laser beam for drawing an image is output. The range from the current value Ic to the maximum current values Ib is a range of use of the drive current Idr.

The light source driver 9 includes an interface 91, three drive current generators 92R, 92G, and 92B, and a controller 93.

The three drive current generators 92R, 92G, and 92B correspond to the three light sources 2R, 2G, and 2B respectively and are configured to generate respective drive currents Idr to be supplied to the light sources 2R, 2G, and 2B. That is, the drive current generator 92R generates the drive current Idr to be supplied to the red light source 2R. The drive current generator 92G generates the drive current Idr to be supplied to the green light source 2G. The drive current generator 92B generates the drive current Idr to be supplied to the blue light source 2B.

Each of the drive current generator 92R, 92G, and 92B includes an offset current source 921 (second current source), a DA converter 922 (first current source), and an adder 923.

The offset current source 921 generates the offset current Ios having a current value according to the set value of the offset current Ios received from the controller 93. The DA converter 922 generates the scale current Isc having a current value according to a set value of the scale current Isc received from the interface 91. The adder 923 adds the offset current Ios generated by the offset current source 921 to the scale current Isc generated by the DA converter 922 to generate the drive current Idr. The drive current Idr thus generated is output to a corresponding one of the light sources 2.

The interface 91 outputs the set value of the scale current Ise, which is received from the video processor 10 for each of the light sources 2, to the DA converter 922 of each of the drive current generators 92R, 92G, and 92B. The controller 93 outputs the set value of the offset current Ios, which is received from the video processor 10 for each of the light sources 2, to the offset current source 921 of each of the drive current generators 92R, 92G, and 92B.

The temperature sensor 11 is disposed in the image display system 1 and is configured to detect the ambient temperature of the light sources 2. A detected temperature detected by the temperature sensor 11 is output to the video processor 10.

Based on an image signal externally supplied, the video processor 10 generates, for each of the light sources 2, current set values for controlling the intensity of a laser beam to be output from each light source 2 (the set value (first set value) of the scale current Isc and the set value (second set value) of the offset current Ios). The video processor 10 outputs the current set values thus generated to the light source driver 9. The image signal is an image signal for forming an image to be displayed on the display object.

The video processor 10 includes a processor body 14 (processor), a corrector 15, and a storage section 16. The storage section 16 is a non-volatile storage section.

The processor body 14 generates, in accordance with the image signal supplied externally, the current set values (i.e., the set value of the scale current Isc and the set value of the offset current Ios) for each of the light sources 2. Specifically, based on gradation values of color components (a red component, a green component, and a blue component) indicated by the image signal, the processor body 14 generates the set value of the scale current Isc according to the gradation value for each pixel of the image. More specifically, the storage section 16 stores a correspondence relationship (hereinafter simply referred to as a "correspondence relationship") between the gradation value and the current value of the scale current Isc. The correspondence relationship is stored for each of the light sources 2. That is, the processor body 14 has a plurality of correspondence relationships corresponding to respective drive current Idr of the three light sources 2. In the present embodiment, the correspondence relationship is in a conversion table but may be in a conversion formula. To generate the set value of the scale current Isc of the drive current Idr for each of the light sources 2, the processor body 14 determines, based on the correspondence relationship for each light source 2, a current value corresponding the gradation value of each color component indicted by the image signal as the set value of the scale current Isc. Thus, the set value of the scale current Ise is generated in accordance with the image signal.

In the present embodiment, when the gradation value of the image signal is within a first gradation range, the processor body 14 sets the set value of the scale current Isc to a current value proportional to the gradation value. When the gradation value of the image signal is within a second gradation range in which numerical values are smaller than numerical values in the first gradation range, the processor body 14 sets, based on the correspondence relationship, the set value of the scale current Isc to a current value determined with reference to the correspondence relationship. The first gradation range is a gradation range larger than the prescribed gradation value (e.g., gradation value 150). The second gradation range is a range smaller than or equal to a prescribed gradation range. That is, the second gradation range is a prescribed range (e.g., gradation values 0 to 150) including a defined range (e.g., gradation values 0 to 100) on a low-gradation side of the total range (e.g., gradation values 0 to 255) of the gradation values. The first gradation range is a remaining gradation range (e.g., gradation values 151 to 255) other than the second gradation range.

Moreover, the storage section 16 stores the set value of the offset current Ios for each of the light sources 2. The processor body 14 is configured to read the set value of the offset current Ios stored in the storage section 16 to determine the set value as the set value of the offset current Ios. In this way, the set value of the offset current Ios is generated.

The set value of the scale current Isc and the set value of the offset current Ios thus generated in the video processor 10 are output to the light source driver 9. Then, in the light source driver 9, the interface 91 inputs the set value of the scale current Isc received from the video processor 10 for each of the light sources 2 to the DA converter 922 of each of the drive current generators 92R, 92G, and 92B. Thus, the DA converter 922 outputs the scale current Isc corresponding to the set value of the scale current Isc thus input. Moreover, the controller 93 inputs the set value of the offset current Ios for each of the light sources 2 from the video processor 10 to the offset current source 921 of each of the drive current generators 92R, 92G, and 92B. In this way, the DA converter 922 outputs the offset current Ios according to the set value of the offset current Ios thus input. Then, in each of the drive current generators 92R, 92G, and 92B, the adder 923 adds the offset current Ios generated by the offset current source 921 to the scale current Isc generated by the DA converter 922 to generate the drive current Idr. The drive current Idr thus generated is input to a corresponding one of the light sources 2. The light sources 2 output the laser beams C1 to C3 with intensities according to the drive currents Idr thus input.

The laser beams C1 to C3 output in this way from the light sources 2 are incident on the scanning mirror 6 via the dichroic mirrors 3, 4, and 5 respectively and the transmission mirror 7. Then, while the scanning mirror 6 reflects the laser beams incident on the scanning mirror 6 toward a display object (e.g., a windscreen of a vehicle), the scanning mirror 6 performs two-dimensional scanning by the laser beams in synchrony with a horizontal synchronization signal and a vertical synchronization signal of an image signal. In this way, an image is displayed on a display object by the laser beams. At this time, the transmission mirror 7 feeds back some of the laser beams to the light receiver 8, and a detection value by the light receiver 8 (i.e., a measured intensity of the laser beams) is input to the video processor 10.

The corrector 15 performs a correction process of the drive currents Idr while the image is displayed on the display object, for example, periodically (e.g., at 10-second intervals) based on the detection value by the light receiver 8 (i.e., the measured intensity of the laser beams) such that for each of the drive currents Idr of the three light sources 2, the difference between the measured intensity and the target intensity of the laser beam is within a prescribed range. The correction process is hereinafter also referred to as a gradation correction process. Through the gradation correction process, the corrector 15 adjusts the white balance of the image to be displayed on the display object, for example.

Specifically, the temperature sensor 11 detects temperature in the image display system 1 (i.e., ambient temperature of each of the light sources 2). If a detection temperature detected by the temperature sensor 11 does not change from a detection temperature in a previous gradation correction process by a predetermined amount of temperature or more, the corrector 15 corrects, for each light source 2, only the scale current Isc of the scale current Isc and the offset current Ios of the drive current Idr, thereby performing the correction process of the drive current Idr (i.e., the gradation correction process).

More specifically, the corrector 15 corrects the current values in the correspondence relationship for each of the light sources 2 such that a difference between the measured intensity and the target intensity of the laser beam of each light source 2 is within a prescribed range, thereby correcting the scale current Isc. For example, a laser beam is emitted at a current value corresponding to a gradation value in the correspondence relationship being defined as the set value of the scale current Ise, and in this case, if the difference between the measured intensity and the target intensity of the laser beam is larger than a prescribed range, the corrector 15 corrects, in the gradation correction process, a current value corresponding to each gradation value in the correspondence relationship to a smaller current value such that the difference between the measured intensity and the target intensity of the laser beam falls within the prescribed range. That is, the gradation correction process described above includes a process of correcting the correspondence relationship such that the difference between the target intensity and the measured intensity of the laser beam of the light source 2 falls within the prescribed range.

The scale current Isc is a current that specifies the gradation value of each pixel in the image. Thus, the corrector 15 is configured to correct the scale current Isc based on the measured intensity of the laser beam which scans each pixel in a non-display range of the image. In this way, it is possible to reduce the influence of the correction (the gradation correction process) over the display range of the image. Specifically, the corrector 15 causes each light source 2 to emit light beams sequentially once at each of the drive currents Idr corresponding to respective gradation values in the correspondence relationship for each light source 2 in a non-display range of the image. Note that "each of the drive currents Idr corresponding to the respective gradation values" is a current value Idr obtained when each current value corresponding to an associated one of gradation values is set as the set value of the scale current Isc. Then, the corrector 15 obtains, for each of the light sources 2, measured intensity of the laser beam from the detection value by the light receiver 8 when each light source 2 is caused to output the laser beam at each of the drive currents Idr corresponding to the respective gradation values in the correspondence relationship. The corrector 15 then corrects each current value (current value of the scale current Isc) corresponding to the associated one of the gradation values in the correspondence relationship such that the difference between the measured intensity thus obtained and the target intensity of the laser beam defined for each gradation value falls within a prescribed range.

Moreover, when the detected temperature by the temperature sensor 11 changes from a detected temperature in a previous gradation correction process by a predetermined amount of temperature or more, the corrector 15 corrects, for each light source 2, both the scale current Isc and the offset current Ios of the drive current Idr, thereby correcting the drive current Idr. More specifically, the corrector 15 corrects the current values in the correspondence relationship for each light source 2 and the set value of the offset current Ios such that the difference between the measured intensity and the target intensity of the laser beam of each light source 2 falls within a prescribed range. Thus, both the offset current Ios and the scale current Isc of the drive current Idr are corrected.

When the ambient temperature of the light sources 2 significantly changes, a change of the intensity characteristic of the light sources 2 also becomes significant. For example, distortion on a low-gradation side of the intensity characteristic becomes significant. Thus, when the ambient temperature of the light sources 2 significantly changes, correction of only the current values in the correspondence relationship causes an excessive load for correcting the current values in the correspondence relationship. Thus, in this case, both the current values in the correspondence relationship and the set value of the offset current Ios are corrected. In this way, it becomes possible to perform correction without causing the excessive load for the correction of the current values in the correspondence relationship.

As described above, the corrector 15 is configured to switch a correction mode for performing the gradation correction process to a first correction mode or a second correction mode in accordance with the ambient temperature of the light sources 2. Here, the gradation correction process is a correction process of the drive current Idr such that the difference between the measured intensity and the target intensity of the laser beam falls within a prescribed range. The first correction mode is a correction mode in which of the current values in the correspondence relationship and the set value of the offset current Ios, only the current values in the correspondence relationship are corrected. That is, the first correction mode is a correction mode in which of the scale current Isc and the offset current Ios of the drive current Idr, only the scale current Isc is corrected. The second correction mode is a correction mode in which both the current values in the correspondence relationship and the set value of the offset current Ios are corrected. That is, the second correction mode is a correction mode in which both the scale current Isc and the offset current Ios of the drive current Idr, is corrected.

In other words, the corrector 15 determines, based on the ambient temperature of the light sources 2, whether or not the offset current Ios is corrected in the gradation correction process. That is, the corrector 15 determines whether or not the offset current Ios is corrected together with the scale current Isc when the drive current Idr is corrected. When a change of the ambient temperature of the light source 2 is larger than or equal to the predetermined temperature, the corrector 15 corrects the offset current Ios in the gradation correction process. That is, when the corrector 15 corrects the drive current Idr, the corrector 15 corrects the offset current Ios together with the scale current Isc.

As described above, according to this embodiment, when the gradation correction process is performed such that the difference between the measured intensity and the target intensity of the laser beam falls within the prescribed range, the correspondence relationship (i.e., the scale current Isc) is corrected. This enables the gradation of an image to be corrected in the non-display range of the image. Thus, the gradation of the image can be corrected without distorting the gradation in the display range of the image.

Note that in the present embodiment, the corrector 15 regularly performs the gradation correction process, but the timing of the gradation correction process is not limited. For example, the corrector 15 may execute the gradation correction process when the detected temperature by the temperature sensor 11 changes by a certain amount or greater or when the brightness of the image display system 1 is adjusted.

One Example of Correspondence Relationship

Figure 3:
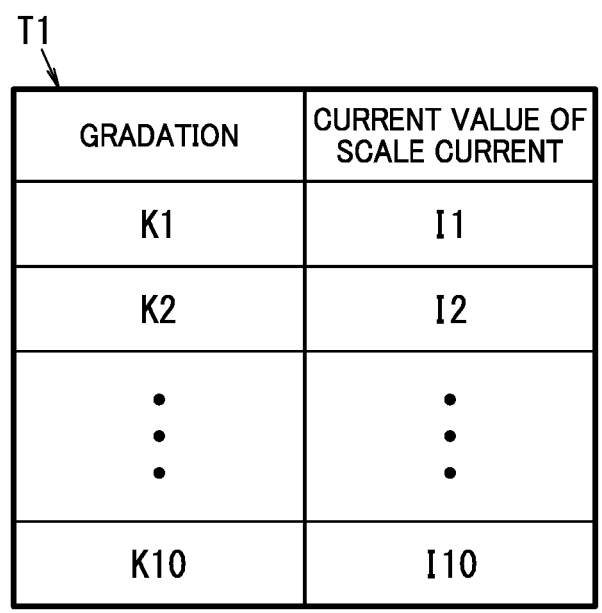
FIG. 3 is a correspondence table illustrating one example of a correspondence relationship between a gradation value of an image signal and a current value of a scale current in the image display system.

A correspondence relationship T1 in FIG. 3 shows one example of the above-described correspondence relationship (i.e., correspondence relationship between the gradation value and the current value of the scale current Isc). The correspondence relationship T1 specifies current values of the scale current Isc to be output from the DA converter 922 with respect to gradation values of an image signal of an input image input to the video processor 10. The correspondence relationship T1 shows, for example, a correspondence relationship for the red light source 2R. In the correspondence relationship T1, a plurality of (e.g., 10) gradation values K1 to K10 correspond to a plurality of (10) current values I1 to I10 on a one-to-one basis. That is, the correspondence relationship T1 includes the plurality of current values I1 to I10 of the scale current Isc which respectively correspond to the plurality of (e.g., 10) specific gradation values K1 to K10 included in the range of the gradation values of the image signal. Note that the number of gradation values adopted in the correspondence relationship T1 is not limited to 10.

Note that in the second gradation range (e.g., gradation values 0 to 150) of the gradation value, a current value corresponding to the gradation value which is not adopted in the correspondence relationship T1 may be determined by linear interpolation of the current values corresponding to the gradation values adopted. Moreover, the current value corresponding to the gradation value which is not adopted may be determined by approximation by a current value corresponding to a gradation value closest to the gradation value which is not adopted.

Figure 4:
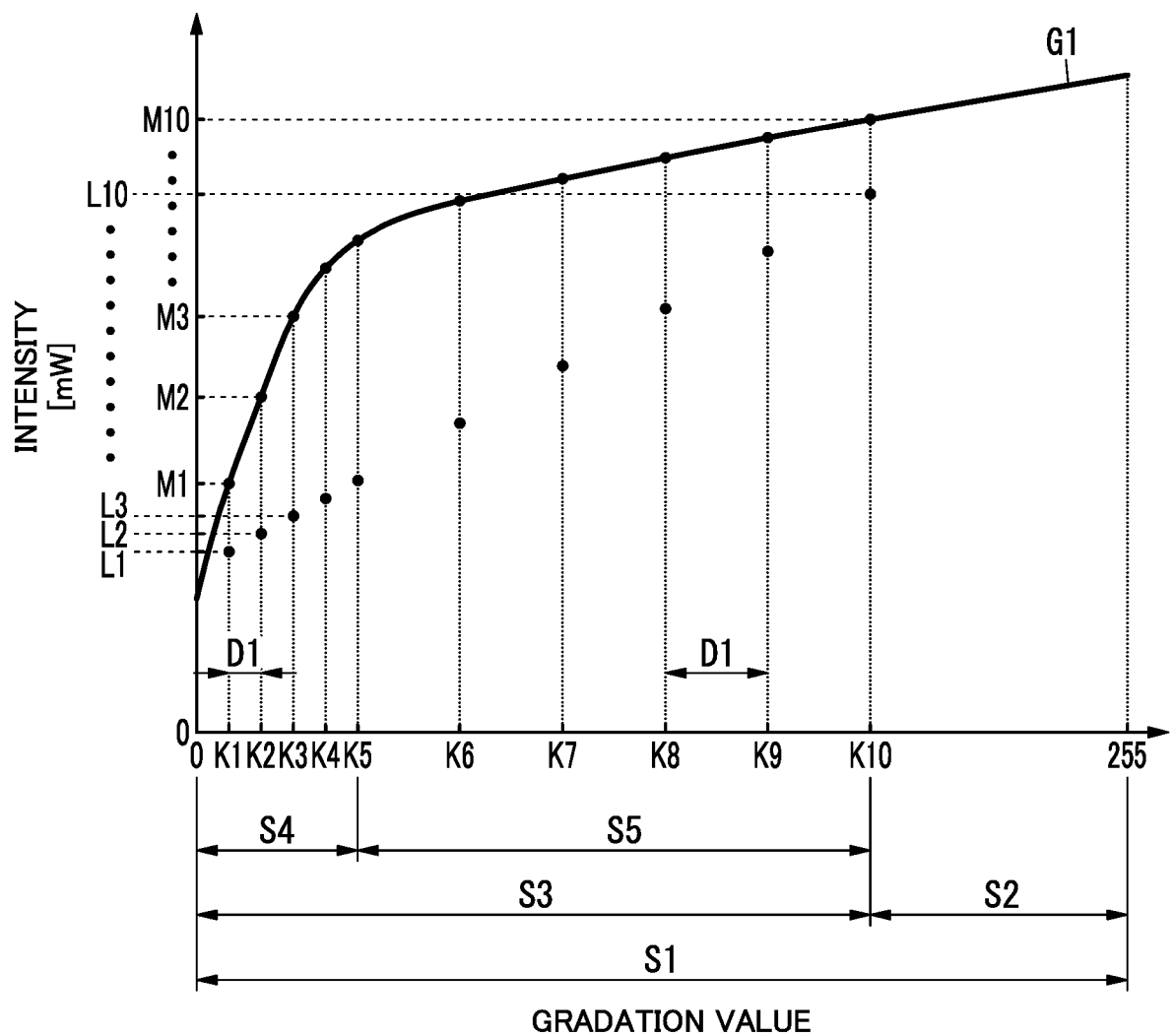
FIG. 4 is an intensity characteristic diagram illustrating one example of a correspondence relationship between the gradation value of the image signal and a target intensity of the laser beam in the image display system.

An intensity characteristic G1 in FIG. 4 shows a relationship of gradation values of an image to target intensities of a laser beam of a light source 2 (e.g., the red light source 2R) at each of the gradation values. As illustrated in FIG. 4, a gradation range (total range) S1 of the image includes a first gradation range S2 and a second gradation range S3. The first gradation range S2 is, as described above, a gradation range (e.g., gradation values 151 to 255) larger than a prescribed gradation value (e.g., gradation value 150), and the second gradation range S3 is a range (e.g., gradation values 0 to 150) smaller than or equal to the prescribed gradation value. The second gradation range S3 includes a defined range S4 (e.g., gradation values 0 to 100) on the low-gradation side and a remaining range S5 (e.g., gradation values 101 to 150) on the high-gradation side.

Note that in the present embodiment, the second gradation range S3 includes the defined range S4 on the low-gradation side and the remaining range S5 on the high-gradation side, but the second gradation range S3 may be a range including only the defined range S4 on the low-gradation side.

As illustrated in FIG. 4, the intensity characteristic G1 changes more significantly in the defined range S4 on the low-gradation side than in the remaining range S5 on the high-gradation side of the defined range S4 on the low-gradation side and the remaining range S5 on the high-gradation side of the second gradation range S3. Thus, for the plurality of gradation values K1 to K10 adopted in the correspondence relationship T1, an interval D1 adopted is preferably smaller in the defined range S4 on the low-gradation side than in the remaining range S5 on the high-gradation side. That is, the interval D1 between each two adjacent gradation values of the plurality of gradation values K1 to K10 are preferably narrower in the defined range S4 on the low-gradation side than in the remaining range S5 on the high-gradation side. Note that the interval D1 adopted is of the gradation values K1 to K10 adopted in the correspondence relationship T1.

A correspondence relationship for the green light source 2G and a correspondence relationship for the blue light source 2B are also configured in a similar manner to the correspondence relationship T1 for the red light source 2R.

Note that the correspondence relationship T1 desirably adopts the intensity characteristic G1 in a case where the ambient temperature of the light source 2 is an ordinary temperature (e.g., 15° C. to 25° C.).

Details of Gradation Correction Process

Figure 5:
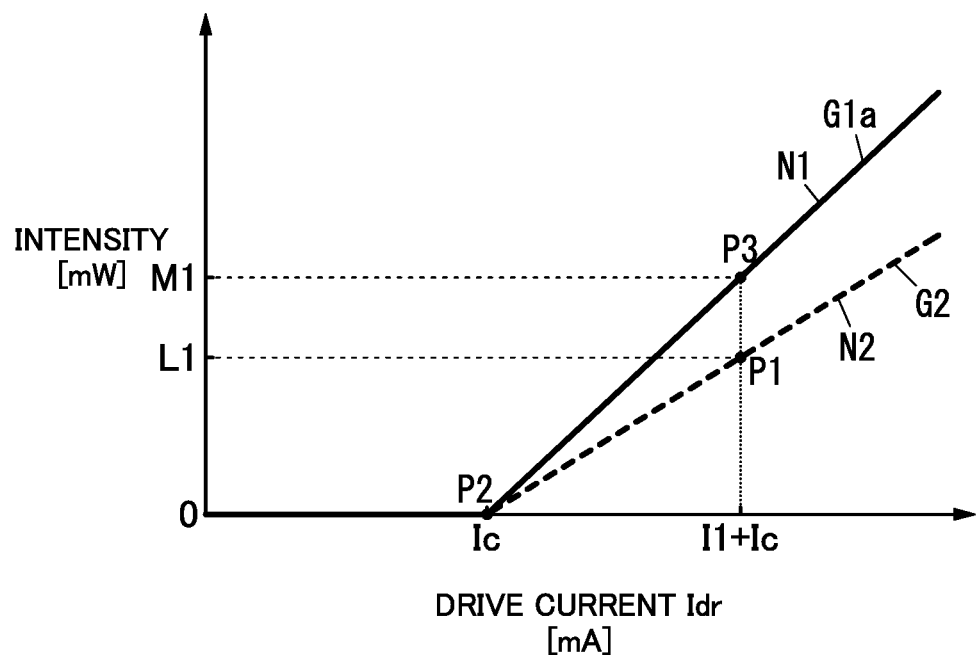
FIG. 5 is an illustrative view illustrating a method for computing a correction coefficient for correcting a current value in the correspondence relationship (the relationship between the gradation value and the current value) in the image display system.
Figure 6:
FIG. 6 is a correspondence table illustrating one example of the corrected correspondence relationship (the correspondence relationship between the gradation value and the current value) after correction in the image display system.

With reference to FIGS. 3 to 5, a description is given of a procedure for correcting each of the current values I1 to I10 in the correspondence relationship T1 in FIG. 3 such that the difference between the measured intensity and the target intensity of the laser beam falls within a prescribed range. That is, a description is given of a procedure for correcting only the scale current Isc of the scale current Isc and the offset current Ios of the drive current Idr in the gradation correction process. A case of correcting current values I1 to I10 in the correspondence relationship T1 for the red light source 2R will be described below.

As illustrated in FIG. 4, the intensity characteristic G1 determines target intensities M1 to M10 of laser beams at the gradation values K1 to K10 when the laser beams are output from the light source 2R at drive currents Idr corresponding to the gradation values K1 to K10 in the correspondence relationship T1 in FIG. 3. Note that the "the drive currents Idr corresponding to the gradation values K1 to K10 in the correspondence relationship T1" are drive currents Idr when current values corresponding to the respective gradation values K1 to K10 in the correspondence relationship T1 are defined as set values of the scale current Ise. The intensities M1 to M10 determined by the gradation values K1 to K10 respectively in the intensity characteristic G1 are the target intensities M1 to M10 of laser beams with the gradation values K1 to K10. The intensities L1 to L10 in FIG. 4 show measured intensities of laser beams output from the light source 2R when the drive currents Idr corresponding to the gradation values K1 to K10 in the correspondence relationship T1 are supplied.

First of all, correction of a current value (e.g., I1) corresponding to a gradation value (e.g., K1) in the correspondence relationship T1 in FIG. 3 will be described. The current value I1 corresponding to the gradation value K1 is set as the set value of the scale current Isc in the DA converter 922, and the light receiver 8 measures the intensity of a laser beam output from the light source 2 when the set value of a preset offset current Ios is set in the offset current source 921. The intensity thus measured is defined as a measured intensity L1 (see FIG. 4).

An intensity characteristic G1a in FIG. 5 is a graph showing the intensity characteristic G1 of FIG. 4 in a coordinate system representing a relationship between the drive current Idr and the intensity of the laser beam. In the coordinate system, the intensity characteristic G1a determines a target intensity of a laser beam at a drive current Idr when the drive current Idr is supplied to the light source 2R to cause the light source 2R to output the laser beam. For example, the intensity characteristic G1a determines a target intensity M1 with respect to a drive current Idr (sum of a current value I1 corresponding to the gradation value K1 and a set value Ic of a preset offset current Ios) at the gradation value K1. In this coordinate system, the gradient (first gradient) of a scale current segment N1 of the intensity characteristic G1a represents a scale value (change amount of the scale current Isc per gradation) and is proportional to the scale current Isc which flows at this time. The scale current segment N1 is part of the intensity characteristic G1a, the part overlapping a range (a range greater than or equal to the current value Ic) of the scale current Isc in the abscissa (a coordinate axis specifying the drive current Idr).

Moreover, a scale current segment N2 is a straight line connecting two coordinate locations P1 and P2 to each other. The coordinate location P1 is a coordinate location defined by a drive current Idr (I1+Ic) corresponding to the gradation value K1 and the measured intensity L1 of a laser beam of the light source 2R at the drive current Idr. The coordinate location P2 is a coordinate location at the set value Ic of the offset current Ios on the coordinate axis (i.e., abscissa) which defines the drive current Idr.

That is, the scale current segment N2 is a graph obtained by linear approximation of a scale current segment of an intensity characteristic G2 estimated from the measured intensity L1 of the laser beam at the drive current Idr (I1+Ic) corresponding to the gradation value K1. A gradient (second gradient) of the scale current segment N2 represents a scale value estimated from the measured intensity L1 of the laser beam and is proportional to the scale current Isc which flows at this time.

In this description, the coordinate location at the set value Ic of the offset current Ios on the abscissa is adopted as the coordinate location P2 to obtain the scale current segment N2, but a coordinate location at a current value of the drive current Idr when the measured intensity of the laser beam on the abscissa is zero may be adopted.

Performing correction such that the measured intensity L1 is matched to the target intensity M1 corresponds to performing correction such that the intensity characteristic G2 is matched to the intensity characteristic G1a. Here, "the intensity characteristic G2 is matched to the intensity characteristic G1a" is not limited to a case where both the value of the intensity characteristic G2 and the value of the intensity characteristic G1a match each other but includes a case where the difference between the both values falls within a defined range. Moreover, correcting the scale current Isc of the drive current Idr corresponds to matching the gradient of the scale current segment N2 to the gradient of the scale current segment N1.

A ratio of the gradient of the scale current segment N1 to the gradient of the scale current segment N2 (ratio between the first gradient and the second gradient) is denoted by $\alpha 1$. When it is taken into consideration that the gradients of the scale current segments N1 and N2 are proportional to the scale current Isc, the ratio $\alpha 1$ is a correction coefficient for correcting the scale current Isc such that the measured intensity L1 matches the target intensity M1. The ratio $\alpha 1$ is hereinafter also referred to as a correction coefficient $\alpha 1$.

Here, the gradient (first gradient) of the scale current segment N1 is a change rate of the target intensity M1 with respect to the drive current Idr when the current value I1 corresponding to the gradation value K1 is the set value of the scale current Isc. The gradient (second gradient) of the scale current segment N2 is a change rate of the measured intensity L1 with respect to the drive current Idr when the current value I1 corresponding to the gradation value K1 is the set value of the scale current Isc. Thus, it can also be said that the correction coefficient $\alpha 1$ is a correction coefficient used to match the change rate of the measured intensity L1 with respect to the drive current Idr to the change rate of the target intensity M1 with respect to the drive current Idr when the current value I1 corresponding to the gradation value K1 is the set value of the scale current Isc.

From FIG. 5, it can be seen that the gradient of the scale current segment N1 is M1/I1, and the gradient of the scale current segment N2 is L1/I1. Here, the scale current segment N1 is approximated to a straight line extending through two coordinate locations P3 and P2. The coordinate location P3 is a coordinate location specified by a drive current Idr (I1+Ic) at a gradation value K1 and the target intensity M1 of a laser beam at the drive current Idr. That is, the coordinate location P3 is a point specified by the drive current Idr (I1+Ic) at the gradation value K1 on_the graph representing the intensity characteristic G1a.

In this case, the correction coefficient $\alpha 1$ is (gradient of scale current segment N1)/(gradient of scale current segment N2) and is thus M1/L1. That is, in order to correct the current value I1 corresponding to a gradation value K1 in the correspondence relationship T1 such that the measured intensity L1 of a laser beam at the gradation value K1 matches the target intensity M1, the current value I1 is at least multiplied by the correction coefficient $\alpha 1$ (see FIG. 6).

In this description, a correction coefficient for a gradation value (e.g., K1) is obtained. In a similar manner as described above, correction coefficients $\alpha 2$ to $\alpha 10$ for other gradation values K2 to K10 are obtained. Then, the remaining current values I2 to I10 are respectively multiplied by the correction coefficients $\alpha 2$ to $\alpha 10$ thus obtained, and thereby, the current values I1 to I10 in the correspondence relationship T1 are corrected (see FIG. 6). Thus, the current values I1 to I10 in the correspondence relationship T1 for the red light source 2R are corrected such that the measured intensity of the laser beam of the red light source 2R matches the target intensity. The current values in the correspondence relationships for the remaining light sources 2B and 2G are corrected in a similar manner as described above.

Figure 7:
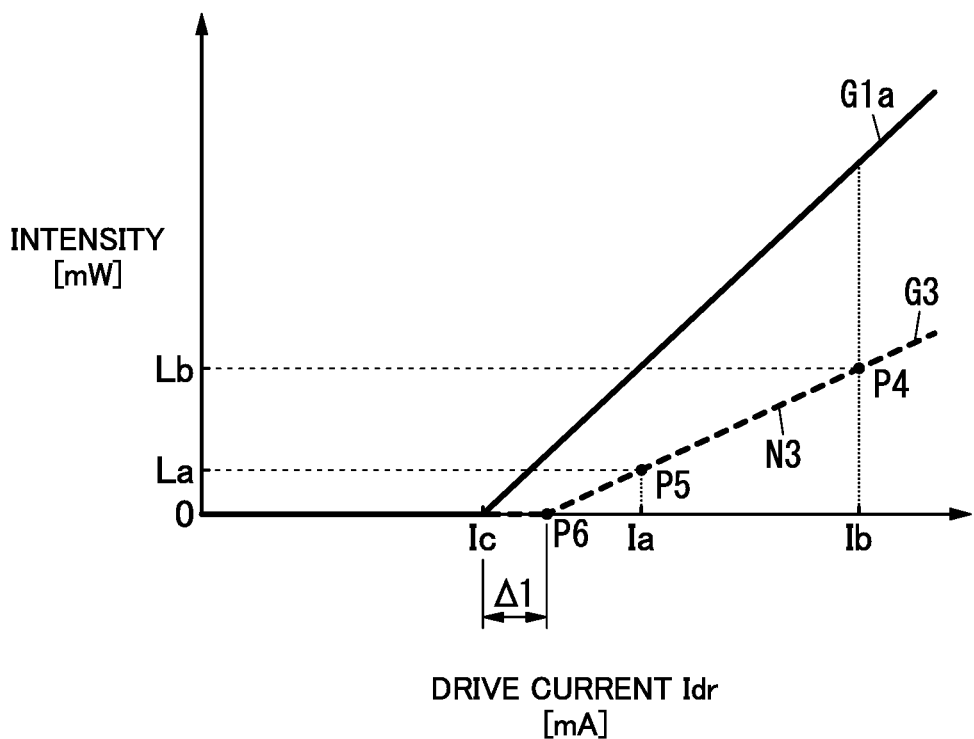
FIG. 7 is an illustrative view illustrating a method for computing a correction constant for correcting a set value of an offset current in the image display system.

Then, with reference to FIG. 7, a description is given of a procedure for correcting each of the current values I1 to I10 in the correspondence relationship T1 shown in FIG. 3 and the set value Ic of the offset current Ios such that the difference between the measured intensity and the target intensity M of the laser beam falls within a prescribed range. That is, a procedure for correcting both the scale current Isc and the offset current Ios of the drive current Idr in the gradation correction process will be described. A case of correcting current values I1 to I10 in the correspondence relationship T1 for the red light source 2R will be described below.

First of all, the set value Ic of the offset current Ios is corrected. The light source 2R is caused to output laser beams at current values Ia and Ib of preset two drive currents, and intensities of the laser beams at this time are measured. The two current values Ia and Ib are not particularly limited, but in order to increase the accuracy, the current value Ia is desirably a current value on the low-gradation side, and the current value Ib is desirably a current value on the high-gradation side. The intensities of the laser beams at the current values Ia and Ib thus measured are respectively denoted by La and Lb. A straight line N3 connecting two coordinate locations P4 (Ia, La) and P5 (Ib, Lb) to each other is a graph obtained by linear approximation of a scale current segment of an intensity characteristic G3 of the light source 2 estimated from these measured intensities La and Lb. The point P6 of intersection of the scale current segment N3 with the abscissa determines a set value (estimation set value) Id of the offset current Ios which is estimated.

The estimation set value Id is (Lb×Ia−La×Ib)/(Lb−La). Thus, a difference $\Delta I$ (=Id−Ic) between the estimation set value Id and the set value Ic is added to the set value Ic of the offset current Ios to correct the set value Ic of the offset current Ios. The difference $\Delta I$ is hereinafter also referred to as a correction constant $\Delta I$. That is, to the set value Ic of the offset current Ios, the correction constant ΔI is added, which thus means that the gradation correction process is performed on the set value Ic to obtain a set value (Ic+ΔI) of the offset current Ios.

Then, for the set value (Ic+ΔI) of the offset current Ios, the current values I1 to I10 in the correspondence relationship T1 are corrected in a similar manner as described above. Thus, the current values I1 to I10 in the correspondence relationship T1 in FIG. 3 and the set value Ic of the offset current Ios are corrected such that the difference between the measured intensity L and the target intensity M of the laser beam falls within a prescribed range.

The current values in the correspondence relationships T1 for the remaining light sources 2 and the set values of the offset currents Ios are corrected in a similar manner as described above.

Description of Operation

Figure 8:
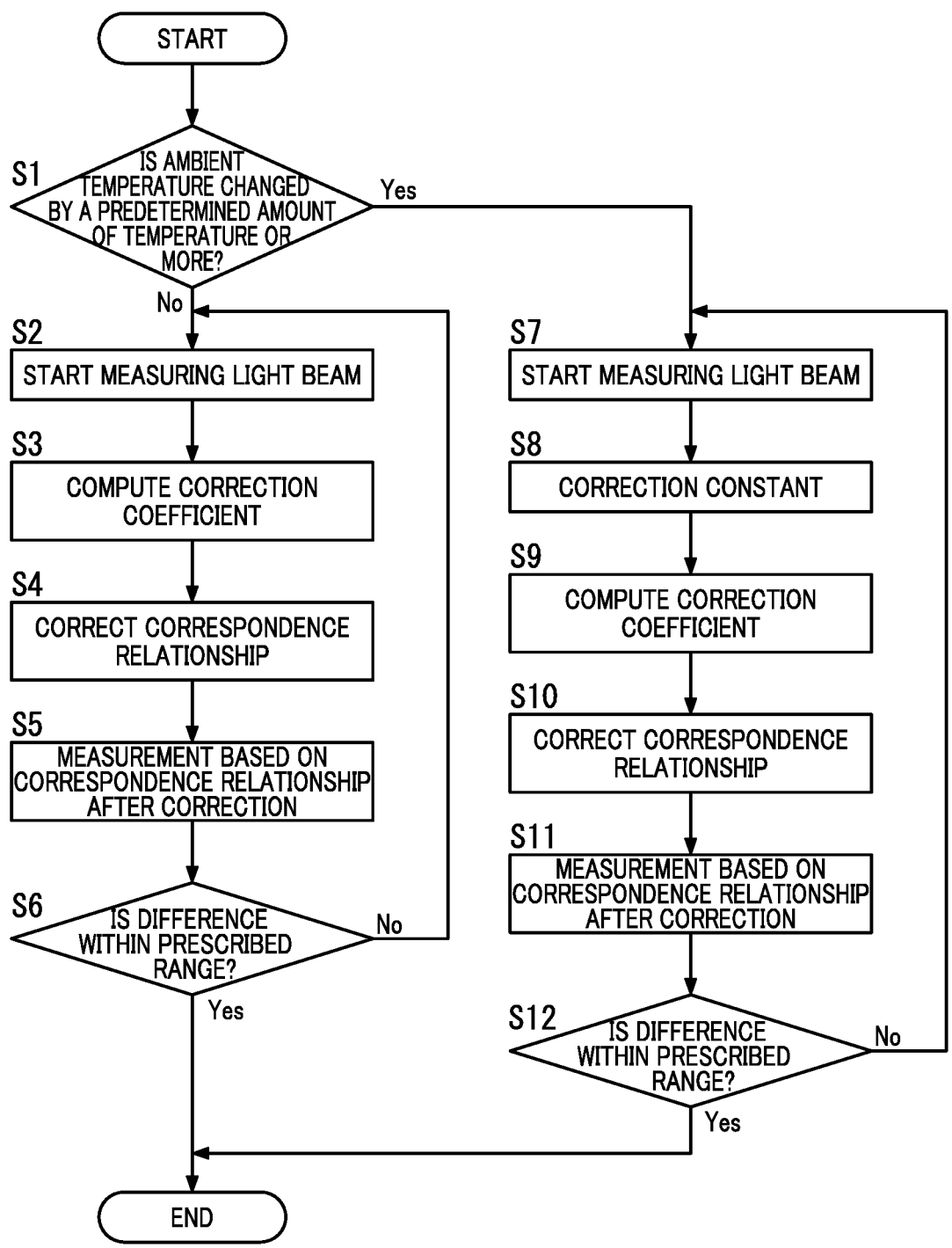
FIG. 8 is a flowchart illustrating operation of the image display system.

With reference to FIG. 8, operation of the image display system 1 will be described.

When the corrector 15 performs the gradation correction process, the corrector 15 monitors, based on the detected temperature by the temperature sensor 11, whether or not an ambient temperature of each light source 2 changes from an ambient temperature of each light source 2 in a previous gradation correction process by a certain temperature or more. If the ambient temperature of each light source 2 does not change from the ambient temperature of each light source 2 in the previous gradation correction process (S1: NO), the corrector 15 starts measuring the laser beam (measuring intensity) (S2). Specifically, at a timing at which a scan location of the laser beam output from the light source 2 is in the non-display range of an image, the corrector 15 sets current values corresponding to the gradation values in the correspondence relationship in the light source driver 9 sequentially as set values of the scale current Isc. Thus, the light sources 2 outputs laser beams at respective gradation values. The measured intensities of the laser beams are measured by the light receiver 8.

Then, the corrector 15 computes, from the measured intensities of the laser beams at respective gradation values in the correspondence relationship, correction coefficients α1 to α10 respectively of current values I1 to I10 corresponding to the respective gradation values in a similar manner as described above (S3). Then, the corrector 15 multiplies the current values I1 to I10 in the correspondence relationship by the correction coefficients α1 to α10 thus computed to correct the current values I1 to I10 in the correspondence relationship (S4).

Then, in order to check the suitability of correction, the corrector 15 measures the intensity of the laser beams in the correspondence relationship after the correction (S5). More specifically, the corrector 15, for example, sequentially sets current values corresponding to gradation values in the light source driver 9 as set values of the scale current Isc, causes the light sources 2 to output laser beams at the gradation values, and causes the light receiver 8 to receive the intensities. Note that measurement of the laser beam in this case is also performed at the timing at which the scan location of the laser beam output from the light source 2 is in the non-display range of the image.

Then, the corrector 15 computes a difference between the measured intensity and the target intensity of the laser beam at each gradation value and determines whether or not the difference is within a prescribed range. If the differences for all the gradation values in the correspondence relationship are within the prescribed range (S6: YES), the corrector 15 determines that the correction coefficients α1 to α10 obtained in step S3 are suitable, and the process ends.

In contrast, if the difference between the measured intensity and the target intensity is out of the prescribed range for one or more of all the gradation values in the correspondence relationship (S6: NO), the corrector 15 determines that the correction coefficients α1 to α10 obtained in step S3 are unsuitable, and the process returns to step S2. The corrector 15 cancels the correction coefficients α1 to α10 computed in step S3 and performs the correction again. The corrector 15 repeats steps S2 to S6 until the determination in S6 results in YES. When the determination in step S6 results in YES, the corrector 15 terminates the process. In this way, the correction coefficients are confirmed, and based on the correspondence relationship after the correction, the set value of the scale current Isc of the light source 2 is set. Other light sources 2 are subjected to similar processes.

Note that in step S6, the correction coefficient of the current value corresponding to the gradation value which results in that the difference between the measured intensity and the target intensity is within the prescribed range may be confirmed, and only a correction coefficient of a current value corresponding to the gradation value which results in that the difference between the measured intensity and the target intensity is out of the prescribed range may be recomputed.

In contrast, if in step S1, the ambient temperature of each light source 2 changes from the ambient temperature of each light source 2 in the previous gradation correction process by a predetermined amount of temperature or more (S1: YES), the corrector 15 starts measuring the laser beam (S7). Specifically, at a timing at which a scan location of the laser beam output from the light source 2 is in the non-display range of an image, the corrector 15 sets prescribed two current values in the light source driver 9 sequentially as set values of the scale current Isc and causes the light source 2 to output laser beams. The measured intensities of the laser beams are measured by the light receiver 8. Then, the corrector 15 computes, from the measured intensities of the laser beams at the two current values, a difference ΔI as a correction constant of the set value Ic of the offset current Ios in the above-described manner. Then, the corrector 15 adds the difference ΔI to the set value Ic of the offset current Ios to correct the set value Ic of the offset current Ios (S8). Based on the set value of the offset current Ios thus corrected, the correction coefficients α1 to α10 of the current values I1 to I10 corresponding to the gradation values in the correspondence relationship are computed in steps S9 and S10 in a similar manner to steps S3 and S4 (S9). Then, the corrector 15 multiplies the current values I1 to I10 in the correspondence relationship by the correction coefficients α1 to α10 thus computed to correct the current value I1 to I10 in the correspondence relationship (S10). Then, in order to check the suitability of the correction, the corrector 15 measures, in a similar manner to step S6, the intensities of the laser beams based on the corrected correspondence relationship after the correction (S11).

Then, the corrector 15 computes a difference between the measured intensity and the target intensity of the laser beam at each gradation value and determines whether or not the difference is within a prescribed range. If for all the gradation values, the difference between the measured intensity and the target intensity is within the prescribed range (S12: YES), the corrector 15 determines that the correction coefficients α1 to α10 obtained in step S3 are suitable, and the process ends.

In contrast, if for one or more of all the gradation values, the difference between the measured intensity and the target intensity is out of the prescribed range (S12: NO), the corrector 15 determines that the correction constant ΔI obtained in step S8 and the correction coefficients α1 to α10 obtained in step S9 are unsuitable, and the process returns to step S7. The corrector 15 cancels the correction constant ΔI and the correction coefficients α1 to α10 computed in steps S8 and S9 and performs the correction again. The corrector 15 repeats steps S7 to S12 until the determination in S12 results in YES. When the determination in step S12 results in YES, the corrector 15 terminates the process. Thus, the correction constant ΔI and the correction coefficients α1 to α10 are confirmed, the set value of the scale current Isc of the light source 2 is set based on the corrected correspondence relationship after the correction, and the set value of the corrected offset current Ios after the correction is set. Other light sources 2 are subjected to similar processes.

Variations

The embodiment is a mere example of various embodiments of the present disclosure. Various modifications are possible depending on design and the like as long as the object of the present disclosure can be achieved. Moreover, a function similar to that of the image display system 1 may be realized by an image display method, a non-transitory computer-readable medium, and the like.

An image display method according to one aspect includes: a light source driving process of supplying, to a light source 2, a drive current Idr including a scale current Ise which changes in accordance with a gradation value indicated by an image signal and an offset current Ios which does not change in accordance with the gradation value to generate the scale current Isc based on a set value of the scale current Isc; an output process of generating the set value of the scale current Ise in accordance with the image signal and outputting the set value of the scale current Isc generated for the light source driving process; and a correction process of performing a correction process of the drive current Idr. The output process includes setting the set value of the scale current Isc to a current value proportional to the gradation value when the gradation value of the image signal is within a first gradation range S2. Moreover, output the process includes setting, based on a correspondence relationship T1 between each of the gradation values K1 to K10 and their corresponding current values I1 to I10 of the scale current Isc, the set value of the scale current Isc to one of the current values I1 to I10 determined with reference to the correspondence relationship T1 when the gradation values K1 to K10 are in a second gradation range S3 in which numerical values are smaller than numerical values in the first gradation range S2. The correction process includes a process of correcting the correspondence relationship T1 such that a difference between each of measured intensities L1 to L10 and their corresponding target intensities M1 to M10 of a light beam from the light source 2 falls within a prescribed range.

A non-transitory computer-readable medium according to one aspect is a non-transitory computer-readable medium on which a program configured to cause a computer system to execute the image display method is recorded.

Summary

An image display system (1) of a first aspect includes: a light source driver (9) configured to supply, to a light source (2), a drive current (Idr) including a first current (Isc) which changes in accordance with a gradation value indicated by an image signal and a second current (Ios) which does not change in accordance with the gradation value and generate the first current (Isc) based on a set value of the first current (Isc); a processor (14) configured to generate the set value of the first current (Isc) in accordance with the image signal and output the set value of the first current (Isc) generated to the light source driver (9); and a corrector (15) configured to perform a correction process of the drive current (Idr). The processor (14) is configured to set the set value of the first current (Isc) to a current value proportional to the gradation value when the gradation value (K1 to K10) of the image signal is within a first gradation range (S2), and set, based on a correspondence relationship (T1) between the gradation value (K1 to K10) and the current value (I1 to I10) of the first current (Isc), the set value of the first current (Isc) to the current value I1 to I10) determined with reference to the correspondence relationship (T1) when the gradation value (K1 to K10) is in a second gradation range (S3) in which numerical values are smaller than numerical values in the first gradation range (S2). The correction process includes a process of correcting the correspondence relationship (T1) such that a difference between a measured intensity (L1 to L10) and a target intensity (M1 to M10) of a light beam from the light source (2) falls within a prescribed range.

With this configuration, the correspondence relationship (T1) (i.e., first current (Isc)) is corrected when the gradation value of an image is corrected such that the difference between the measured intensity (L1 to L10) and the target intensity (M1 to M10) of the light beam (C1 to C3) output from the light source (2) falls within the prescribed range. Thus, the gradation value of the image can be corrected in a non-display range of the image. As a result, the gradation value of the image can be corrected without distorting the gradation value in a display range of the image.

In an image display system (1) of a second aspect referring to the first aspect, the second current (Ios) is set to a current value (Ic) smaller than or equal to a threshold current value (Ith) at which the light source (2) starts emitting the light beam.

This configuration enables the second current (Ios) to be reduced. Thus, variations of the second current (Ios) can be reduced, and thus, it is possible to reduce influence of variations of the gradation value due to the variation of the second current (Ios) over a display image.

In an image display system (1) of a third aspect referring to the first or second aspect, the corrector (15) is configured to, when the current value (I1 to I10) corresponding to the gradation value (K1 to K10) in the corresponding relationship (T1) is defined as the set value of the input current (Isc), obtain a correction coefficient (α1 to α10) for matching a change rate of the measured intensity (L1 to L10) of the light beam from the light source (2) with respect to the drive current (Idr) to a change rate of the target intensity (M1 to M10) with respect to the drive current (Idr) and correct the correspondence relationship (T1) based on the correction coefficient (α1 to α10).

With this configuration, the correspondence relationship (T1) can be corrected by a simple process such that the difference between the measured intensity (L1 to L10) and the target intensity (M1 to M10) falls within a prescribed range.

In an image display system (1) of a fourth aspect referring to any one of the first to third aspects, the light source driver (9) is configured to generate the second current (Ios) based on the set value of the second current (Ios), and the correction process includes a process of correcting the set value of the second current (Ios).

With this configuration, correction of the drive current (Idr) can be divided into correction of the first current (Isc) of the drive current (Idr) and correction of the second current (Ios) of the drive current (Idr). This suppresses the first current (Isc) from being excessively corrected.

In an image display system (1) of a fifth aspect referring to any one of the first to fourth aspects, the corrector (15) is configured to determine whether or not to correct the second current (Ios) in the correction process based on an ambient temperature of the light source (2).

With this configuration, it is possible to determine whether or not to correct the second current (Ios) in accordance with the ambient temperature of the light source (2).

In an image display system (1) of a sixth aspect referring to the fifth aspect, the corrector (15) is configured to correct the second current (Ios) in the correction process when the ambient temperature of the light source (2) changes by a predetermined amount of temperature or more.

With this configuration, when the ambient temperature of the light source (2) significantly changes (i.e., when a temperature change of the intensity characteristic of the light source (2) is significant), the second current (Ios) can be corrected together with the first current (Isc).

In an image display system (1) of a seventh aspect referring to any one of the first to sixth aspects, the correspondence relationship (T1) includes a plurality of the gradation values (K1 to K10). The second gradation range (S3) includes a defined range (S4) on a low-gradation side and a remaining range (S5) on a high-gradation side, and an interval (D1) between each two of the plurality of gradation values (K1 to K10) is smaller in the defined range (S4) on the low-gradation side than in the remaining range (S5) on the high-gradation side.

With this configuration, it is possible to perform fine correction on the defined range (S4) on the low-gradation side where the intensity characteristic (G1) of the light beam (C1 to C3) output from the light source (2) significantly changes.

In an image display system (1) of an eighth aspect referring to any one of the first to seventh aspects, the light source driver (9) includes a first current source (922) configured to generate the first current (Isc), a second current source (921) configured to generate the second current (Ios), and an adder (923) configured to add the first current (Isc) to the second current (Ios) to generate the drive current (Idr).

With this configuration, the drive current (Idr) can be generated from the first current (Isc) and the second current (Ios) with a simple configuration.

In image display system (1) of a ninth aspect referring to any one of the first to eighth aspects, the light source includes a plurality of the light sources (2) configured to output the light beam (C1 to C3) of colors different from each other. The light source driver (9) is configured to supply each of a plurality of the drive currents (Idr) to a corresponding one of the plurality of light sources (2). The processor (14) includes a plurality of the correspondence relationships (T1) each corresponding to an associated one of the plurality of drive currents (Idr). The corrector (15) is configured to perform the correction process on each of the plurality of drive currents (Idr).

With this configuration, also when the light beams (C1 to C3) output from the light sources (2) include light beams of colors different from each other, the gradation values of the light beams (C1 to C3) of the respective colors can be individually corrected.

In image display system (1) of a tenth aspect referring to any one of the first to eighth aspects, the corrector (15) is configured to execute the correction process on each of the plurality of drive currents (Idr) to adjust white balance of a light beam including light beams output from the plurality of light sources (2).

With this configuration, it is possible to adjust the white balance of the light including the light beams (C1 to C3) output from the plurality of light sources (2).

A movable object of an eleventh aspect includes: the image display system (1) of any one of the first to tenth aspects; and a movable object body on which the image display system (1) is mounted.

With this configuration, it is possible to provide a movable object including the image display system (1).

An image display method of a twelfth aspect includes: a light source driving process of supplying, to a light source (2), a drive current (Idr) including a first current (Ise) which changes in accordance with a gradation value indicated by an image signal and a second current (Ios) which does not change in accordance with the gradation value and to generate the first current (Isc) based on a set value of the first current (Isc); an output process of generating the set value of the first current (Isc) in accordance with the image signal, and outputting the set value of the first current (Isc) generated; and a correction process of performing a correction process of the drive current (Idr). The output process includes setting the set value of the first current (Ise) to a current value proportional to the gradation value when the gradation value of the image signal is within a first gradation range (S2) and setting, based on a correspondence relationship (T1) between the gradation value (K1 to K10) and the current value (I1 to I10) of the first current (Isc), the set value of the first current (Isc) to the current value (I1 to I10) determined with reference to the correspondence relationship (T1) when the gradation value (K1 to K10) is in a second gradation range (S3) in which numerical values are smaller than numerical values in the first gradation range (S2). The correction process includes a process of correcting the correspondence relationship (T1) such that a difference between a measured intensity (L1 to L10) and a target intensity (M1 to M10) of a light beam from the light source (2) falls within a prescribed range.

With this configuration, the correspondence relationship (T1) (i.e., first current (Isc)) is corrected when the gradation value of an image is corrected such that the difference between the measured intensity (L1 to L10) and the target intensity (M1 to M10) of a light beam (C1 to C3) output from the light source (2) falls within the prescribed range. Thus, the gradation value of the image can be corrected in a non-display range of the image. As a result, the gradation value of the image can be corrected without distorting the gradation value in a display range of the image.

A non-transitory computer-readable medium of a thirteenth aspect is a non-transitory computer-readable medium on which a program configured to cause a computer system to execute the image display method of the twelfth aspect is recorded.

With this configuration, it is possible to provide a program for causing a processor to execute the image display method.

While various embodiments have been described herein above, it is to be appreciated that various changes in form and detail may be made without departing from the spirit and scope of the present disclosure presently or hereafter claimed.

CROSS-REFERENCE TO RELATED APPLICATION

The present application is based upon and claims the benefit of priority of Japanese Patent Application No. 2019-057235, filed on Mar. 25, 2019, the entire contents of which are incorporated herein by reference.

The invention claimed is:

1. An image display system, comprising:
a light source driver that
supplies, to a light source, a drive current including a first current which changes in accordance with a gradation value indicated by an image signal and a second current which does not change in accordance with the gradation value, and
generates the first current based on a set value of the first current;
a processor that generates the set value of the first current in accordance with the image signal and output the set value of the first current generated to the light source driver;
a corrector that performs a correction process on the first current generated based on the set value of the first current generated in the processor to correct the drive current; and
a temperature sensor that detects an ambient temperature of the light source at each correction process,
wherein
the processor further
sets the set value of the first current to a current value proportional to the gradation value when the gradation value of the image signal is within a first gradation range, and
sets, based on a correspondence relationship between the gradation value and the current value of the first current, the set value of the first current to a current value determined with reference to the correspondence relationship when the gradation value is in a second gradation range in which numerical values are smaller than numerical values in the first gradation range,
the correction process includes a process of correcting the correspondence relationship such that a difference between a measured intensity and a target intensity of a light beam from the light source falls within a prescribed range, and
the corrector further
determines whether or not to correct the second current in the correction process based on the ambient temperature of the light source detected during a current correction process in comparison with a previous ambient temperature of the light source detected during a previous correction process, and
executes the correction process of the second current in the correction process when the ambient temperature of the light source detected during the current correction process is changed by at least a predetermined amount from the previous ambient temperature of the light source detected during the previous correction process.

2. The image display system of claim 1, wherein the second current is set to a current value smaller than or equal to a threshold current value at which the light source starts emitting the light beam.

3. The image display system of claim 1, wherein
the corrector, when the current value corresponding to the gradation value in the corresponding relationship is defined as the set value of the first current,
obtains correction coefficient for matching a change rate of the measured intensity of the light beam from the light source with respect to the drive current to a change rate of the target intensity with respect to the drive current, and
corrects the correspondence relationship based on the correction coefficient.

4. The image display system of claim 1, wherein
the light source driver generates the second current based on the set value of the second current, and
the correction process includes a process of correcting the set value of the second current.

5. The image display system of claim 1, wherein
the correspondence relationship includes a plurality of the gradation values,
the second gradation range includes a defined range on a low-gradation side and a remaining range on a high-gradation side, and
an interval between each two of the plurality of gradation values is smaller in the defined range on the low-gradation side than in the remaining range on the high-gradation side.

6. The image display system of claim 1, wherein
the light source driver includes
a first current source that generates the first current,
a second current source that generates the second current, and
an adder that adds the first current to the second current to generate the drive current.

7. The image display system of claim 1, wherein
the light source includes a plurality of the light sources that output light beams of colors different from each other,
the light source driver supplies each of a plurality of the drive currents to a corresponding one of the plurality of light sources,
the processor includes a plurality of the correspondence relationships each corresponding to an associated one of the plurality of drive currents, and
the corrector performs the correction process on each of the plurality of drive currents.

8. The image display system of claim 7, wherein
the corrector executes the correction process on each of the plurality of drive currents to adjust white balance of a light beam including light beams output from the plurality of light sources.

9. A movable object, comprising:
the image display system of claim 1; and
a movable object body on which the image display system is mounted.

10. An image display method, comprising:
a light source driving process of supplying, to a light source, a drive current including a first current which changes in accordance with a gradation value indicated by an image signal and a second current which does not change in accordance with the gradation value to generate a first current based on a set value of the first current;

an output process of generating the set value of the first current in accordance with the image signal and outputting the set value of the first current generated;

a correction process of performing a correction process on the first current generated based on the set value of the first current generated in the output process to correct the drive current; and detecting, by a temperature sensor, an ambient temperature of the light source during each correction process, wherein the output process includes setting the set value of the first current to a current value proportional to the gradation value when the gradation value of the image signal is within a first gradation range, and setting, based on a correspondence relationship between the gradation value and the current value of the first current, the set value of the first current to a current value determined with reference to the correspondence relationship when the gradation value is in a second gradation range in which numerical values are smaller than numerical values in the first gradation range, the correction process includes a process of correcting the correspondence relationship such that a difference between a measured intensity and a target intensity of a light beam from the light source falls within a prescribed range, the correction process further includes a process of determining whether or not to correct the second current based on the ambient temperature of the light source detected during a current correction process in comparison with a previous ambient temperature of the light source detected during a previous correction process, and a process of correcting the second current when the ambient temperature of the light source detected during the current correction process is changed by at least a predetermined amount from the previous ambient temperature of the light source detected during the previous correction process.

11. A non-transitory computer-readable medium on which a program causes a computer system to execute the image display method of claim 10 is recorded.

\* \* \* \* \*